United States Patent Office 3,682,696
Patented Aug. 8, 1972

3,682,696
METHOD FOR PRODUCING ANTI-STATIC PAPER
Toshitaka Yasuda, Suita, Japan, assignor to Tatsuta Electric Wire & Cable Co., Ltd., Higashi-Osaka, Osaka Prefecture, Japan
No Drawing. Filed Nov. 21, 1969, Ser. No. 878,898
Int. Cl. D21h 1/22
U.S. Cl. 117—154
4 Claims

ABSTRACT OF THE DISCLOSURE

The invention relates to the method for producing anti-static paper, and more particularly to the method wherein a static electricity preventive agent, which is insoluble or slightly soluble in water but soluble in organic solvent, viz, a small quantity of static electricity preventive surface active agent of which HLB (the hydrophile-lypophile balance of the molecule) is less than 9, is added to the pulp in the paper manufacturing process or is admixed with the coating material in the paper coating process.

---

The invention has for its object to prevent paper from being charged with static electricity without exerting any harmful influence upon the physical and chemical characteristics thereof.

The invention is characterized by the method wherein a small quantity of a powder of a non-electrifiable inorganic substance, which is obtained by melting a surface active agent of HLB below 9 in an organic solvent and then causing it to adhere to the surface of the said powder, is added either to the pulp in the paper manufacturing process or to the coating material in the paper coating process, so that the said powder will adhere to the inside or the surface of the paper uniformly. The reason why the HLB of the electrification preventive surface active agent is restricted to less than 9 in the present invention is that if the HLB of the agent is very high, it is liable to be separated from the inorganic substance powder by the water which is used in large quantities in the paper manufacturing process or the coating material preparing process, with the result that the effect of the said agent will be lost. Moreover, the foaming phenomenon and the like troubles are apt to impair the operational efficiency and the final finish of the product. As a result of a series of experiments, however, it has been ascertained that all the foregoing problems can be overcome successfully if the HLB of the electrification preventive surface active agent is less than 9.

In case the electrification preventive surface active agent is added to the coating material in the paper coating process, a water soluble electrification preventive surface active agent with an HLB above 9 can be utilized without resorting to the method according to the invention. Generally speaking, however, such water soluble electrification preventive surface active agents have poor heat and light resistance, the processed paper being liable to be discolored as a result.

On the other hand, though the electrification preventive, with an HLB below 9, which is insoluble or slightly soluble in water, has greater heat and light resistance, it is impossible to produce paper containing the said electrification preventive uniformly distributed therein in the paper manufacturing or paper coating process wherein a large quantity of water is used unless the method of the invention is taken advantage of.

The following are the electrification preventive surface active agents utilizable in the invention:

Aliphatic amine salts, e.g.

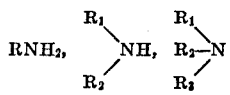

Aliphatic ammonium salts, e.g.

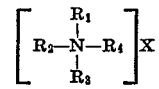

Polyethyleneglycol esters, e.g.

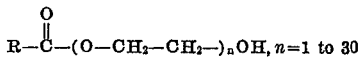

Polyethyleneglycol ether, e.g.

R—(O—CH$_2$—CH$_2$)$_n$OH, $n=1$ to 30

Alkylphenol/polyethyleneglycol condensates, e.g.

Polyethyleneglycol alkylamides, e.g.

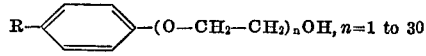

Polyethyleneglycol alkylamines, e.g.

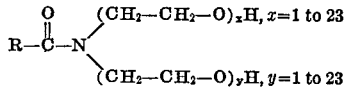

Polyhydric alcohol esters, e.g.

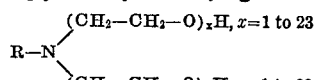

Ester/ether condensates, e.g.

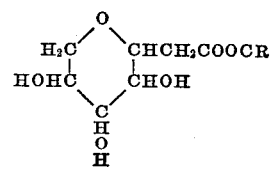

Alkylbetaine, e.g.

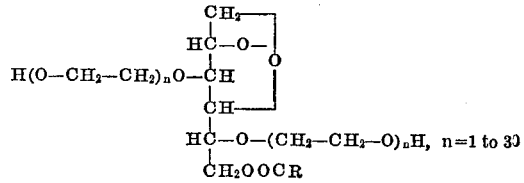

Wherein R is an aliphatic hydrocarbon radical. X is an anion, e.g. Cl$^-$, OH$^-$ and Br$^-$.

From any of the above groups any one whose HLB is less than 9 may be chosen.

The description of the preferred embodiments will be given hereunder.

EXAMPLE 1

One of the polyethyleneglycol alkylamines whose HLB is below 9 was chosen as electrification preventive surface active agent, 2.5 g. thereof being added to 1,000 cc. of ethyl alcohol and completely dissolved by heating at approximately 60° C. 1,000 g. of dry active alumina powder with an average diameter of 1 micron being added to the said solution, the resultant mixture being fully agitated and then placed in a constant temperature oven of approximately 80° C. so as to perfectly remove ethyl alcohol by evaporation. By the foregoing process was obtained alumina powder adsorbed by the aforementioned electrification preventive surface active agent whose HLB is less than 9. Twenty parts of the said powder was added to 100 parts of BSP at 60° SR in the beater of paper manufacturing process to obtain electrification preventive paper of the invention.

EXAMPLE 1

In producing art paper, 100 parts of the alumina powder obtained in Example No. 1 which had been adsorbed electrification preventive surface active agent of HLB less than 9 was added to 100 parts of clay, coating material being prepared with starch as a binder, the said coating material being so coated that the coating quantity will be 15 parts as against 100 parts in dry weight of BSP at 60° SR. By the foregoing process electrification preventive art paper was obtained.

In the foregoing embodiments active alumina powder was used as inorganic substance. It is needless to mention, however, that active alumina is not necessarily required but any other substance is utilizable insofar as it is an inorganic filler used in the paper manufacturing process. Thus, for example, kaolin, clay, talc, aluminum hydroxide, gypsum, titanium oxide, magnesium oxide, calcium carbonate, magnesium carbonate, zinc sulfide, silica, calcium silicate, magnesium silicate, satin white, diatomic earth may be employed.

What I claim is:

1. A paper having anti-static properties and resistance to heat or light discoloration, having incorporated therein an anti-static amount of an inorganic powder insoluble in water, which inorganic powder is impregnated with an anti-static surface active agent insoluble or slightly soluble in water, but soluble in organic solvents, which surface active agent has an HLB of less than 9.

2. A paper according to claim 1 wherein the anti-static surface active agent comprises at least one member selected from the group consisting of aliphatic amine salts, aliphatic ammonium salts, polyethyleneglycol esters, polyethyleneglycol ethers, alkylphenol/polyethyleneglycol condensates, polyethyleneglycol alkylamides, polyethyleneglycol alkylamines, polyhydric alcohol esters, ester/ether condensates, or alkylbetaines, and wherein the inorganic powder is selected from the group consisting of active alumina, kaolin, clay, talc, aluminum hydroxide, gypsum, titanium oxide, magnesium oxide, calcium carbonate, magnesium carbonate, zinc sulfide, silica, calcium silicate, magnesium silicate, satin white, and diatomic earth.

3. A paper having anti static properties and resistance to light and heat discoloration, said paper being coated with an anti static amount of an inorganic powder insoluble in water, which inorganic powder is impregnated with an anti-static surface active agent insoluble or slightly soluble in water, but soluble in organic solvents, which surface active agent has an HLB of less than 9.

4. A paper according to claim 3 wherein the anti-static surface active agent comprises at least one member selected from the group consisting of aliphatic amine salts, aliphatic ammonium salts, polyethyleneglycol esters, polyethyleneglycol ethers, alkylphenol/polyethyleneglycol condensates, polyethyleneglycol alkylamides, polyethyleneglycol alkylamines, polyhydric alcohol esters, ester/ether condensates, or alkylbetaines, and wherein the inorganic powder is selected from the group consisting of active alumina, kaolin, clay, talc, aluminum hydroxide, gypsum, titanium oxide, magnesium oxide, calcium carbonate, magnesium carbonate, zinc sulfide, silica, calcium silicate, magnesium silicate, satin white, and diatomic earth.

References Cited
UNITED STATES PATENTS

| | | | |
|---|---|---|---|
| 2,249,118 | 7/1941 | DeWitt | 162—158 X |
| 2,649,143 | 8/1953 | Simon et al. | 155—182 |
| 2,717,842 | 9/1955 | Vitalis | 117—138.8 |
| 2,717,877 | 9/1955 | Vitalis | 252—8.7 |
| 2,989,882 | 6/1961 | Remer | 117—154 X |
| 3,414,431 | 12/1968 | Shibe et al. | 117—154 X |

WILLIAM D. MARTIN, Primary Examiner

M. R. LUSIGNAN, Assistant Examiner

U.S. Cl. X.R.

162—158, 181 R, 181 A, 181 B, 181 C, 181 D